(12) United States Patent
Benjamin et al.

(10) Patent No.: US 10,465,741 B2
(45) Date of Patent: Nov. 5, 2019

(54) NUT AND WASHER ASSEMBLY

(71) Applicant: Delta Air Lines, Inc., Atlanta, GA (US)

(72) Inventors: Joe Abraham Benjamin, College Park, GA (US); Gregory Scott Council, Winston, GA (US); James Andrew Buttrill, Jonesboro, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 387 days.

(21) Appl. No.: 15/241,800

(22) Filed: Aug. 19, 2016

(65) Prior Publication Data
US 2018/0051738 A1 Feb. 22, 2018

(51) Int. Cl.
  *F16B 43/00* (2006.01)
  *F16B 41/00* (2006.01)
  *F16B 39/04* (2006.01)

(52) U.S. Cl.
  CPC ............ *F16B 41/002* (2013.01); *F16B 39/04* (2013.01); *F16B 43/00* (2013.01)

(58) Field of Classification Search
  CPC ......... F16B 41/002; F16B 43/00; F16B 39/26
  USPC .......................................... 411/109, 432, 533
  See application file for complete search history.

(56) References Cited

U.S. PATENT DOCUMENTS

| | | | |
|---|---|---|---|
| 1,177,077 A | 3/1916 | Worrest | |
| 2,529,343 A | 11/1950 | Lamb | |
| 2,679,880 A | 6/1954 | Poupitch | |
| 3,181,584 A | 5/1965 | Borowsky | |
| 3,659,491 A | 5/1972 | Duffy et al. | |
| 3,942,570 A * | 3/1976 | Bochman, Jr. | .......... F16B 39/10 411/220 |
| 3,973,611 A | 8/1976 | Profit | |
| 4,031,936 A | 6/1977 | Curtis | |
| 4,900,209 A | 2/1990 | Reynolds | |
| 5,180,265 A * | 1/1993 | Wiese | ...................... F16B 39/08 411/150 |
| 5,393,183 A * | 2/1995 | Hinton | ..................... F16B 39/26 411/361 |
| 5,507,517 A * | 4/1996 | Krawczak | ................ B60G 7/00 280/124.155 |
| 5,533,849 A * | 7/1996 | Burdick | ................ F16B 39/282 411/120 |
| 5,904,460 A * | 5/1999 | Kawabata | ............... F16B 39/26 411/155 |
| 6,074,148 A * | 6/2000 | Wilson | .................... F16B 37/14 411/375 |
| 6,435,791 B1 * | 8/2002 | Bydalek | .................. B60B 3/145 411/371.2 |
| 6,554,552 B2 * | 4/2003 | McKinlay | ............... F16B 39/26 411/134 |
| 6,976,817 B1 | 12/2005 | Grainger | |
| 7,437,976 B1 | 10/2008 | Goldbaum | |

(Continued)

*Primary Examiner* — Gary W Estremsky
(74) *Attorney, Agent, or Firm* — King & Spalding (57) ABSTRACT

A nut and washer assembly includes a washer unit that is coupled to a nut. The washer unit includes a housing and a washer that is disposed within a sleeve on an inner surface of the housing such that the washer is inseparable from and axially rotatable with respect to the housing. The housing is attached to the nut such that the washer captured within the housing of the washer unit and the nut operate as a single unit.

12 Claims, 8 Drawing Sheets

(56) References Cited

U.S. PATENT DOCUMENTS

| | | | |
|---|---|---|---|
| 7,811,038 B2* | 10/2010 | Jimenez | F16B 39/32 |
| | | | 411/204 |
| 7,818,862 B2 | 10/2010 | Arany-Kovacs | |
| 8,459,919 B2* | 6/2013 | Ehrler | F16B 39/26 |
| | | | 411/149 |
| 8,591,157 B1* | 11/2013 | Stewart | F16B 31/028 |
| | | | 411/10 |
| 2004/0175252 A1 | 9/2004 | Kurczynski | |
| 2004/0234358 A1 | 11/2004 | Genick | |
| 2007/0128003 A1 | 6/2007 | Shiu | |
| 2008/0107498 A1 | 5/2008 | Arany-Kovacs | |
| 2016/0252128 A1* | 9/2016 | Haas | F16B 39/38 |
| | | | 411/429 |

* cited by examiner

NUT AND WASHER ASSEMBLY

FIELD OF THE INVENTION

Embodiments of this disclosure relate generally to fasteners, and more particularly to a nut and washer assembly.

BACKGROUND

In certain applications, for example, aircraft landing gears, a landing gear wheel and brake assembly may be retained by a nut (axle nut) and a washer. A landing gear in an aircraft is a structure that supports the aircraft on the ground and allows it to taxi, take off, and land. Typically, the aircraft has several landing gear units including nose landing gear (NLG) and main landing gear (MLG). Most configurations of the landing gear typically include wheels equipped with shock absorbers, brakes and other suspension components.

Figure 1A:
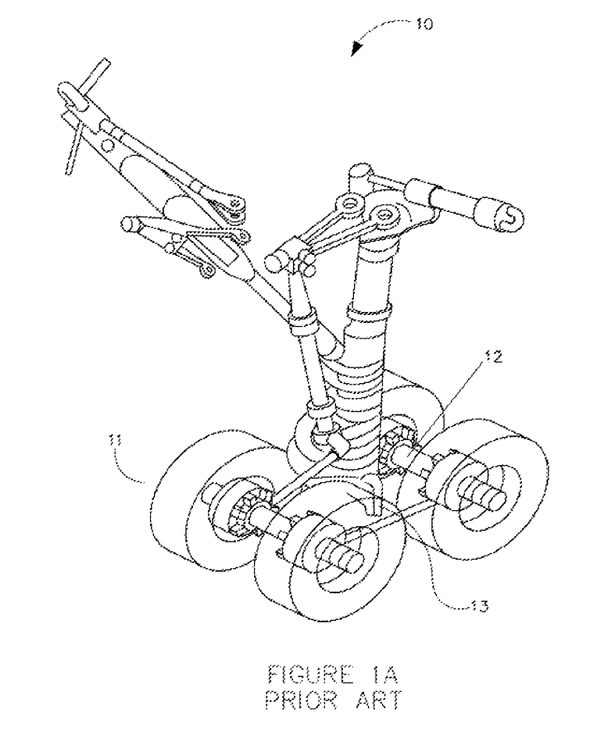
FIG. 1A illustrates an example main landing gear on a commercial aircraft, in accordance with example embodiments of a prior art.
Figure 1B:
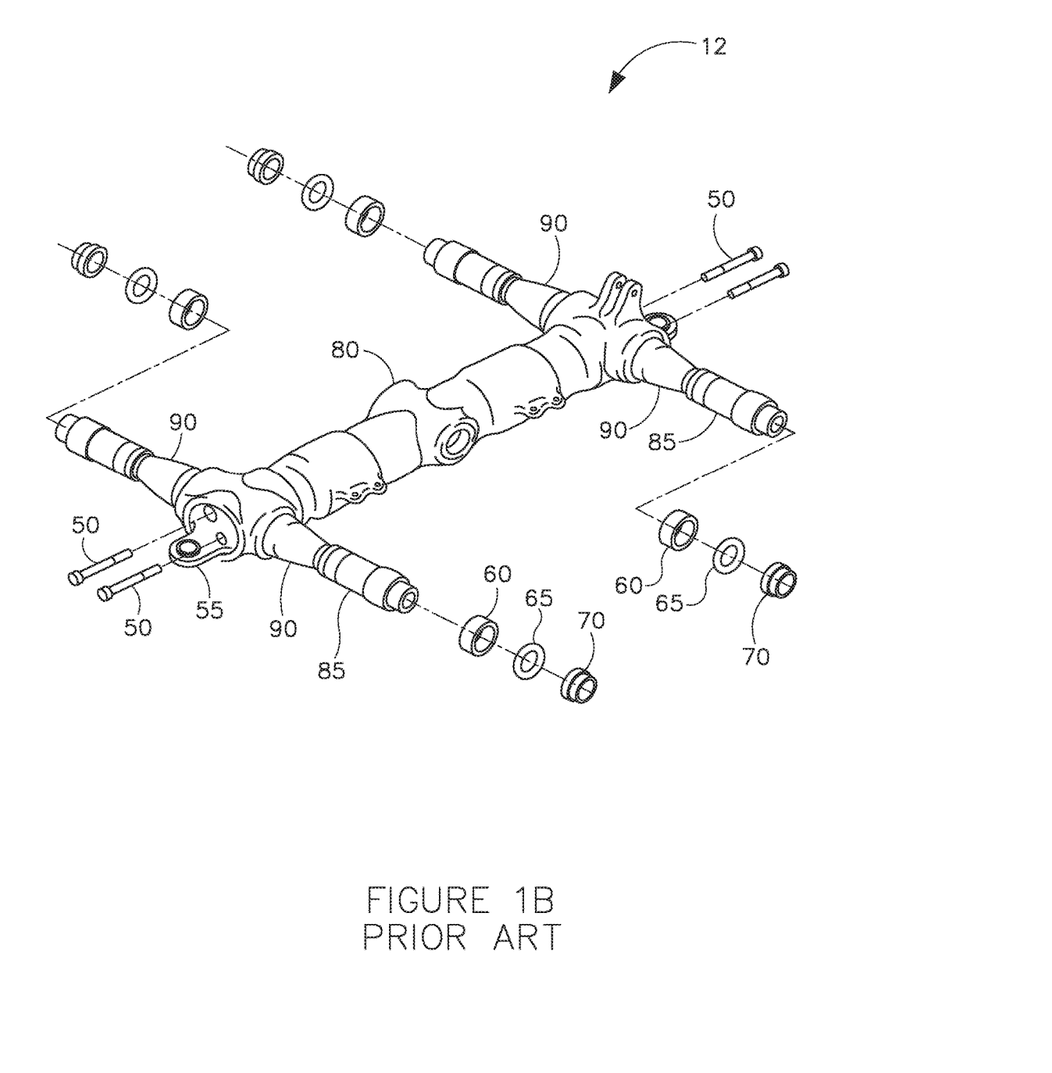
FIG. 1B illustrates a detailed view of a main gear truck assembly of the example main landing gear of FIG. 1A, in accordance with example embodiments of a prior art.

FIG. 1A illustrates an example of a main landing gear 10 on a commercial aircraft. The main landing gear 10 typically includes two or four wheels 11 mounted on a main gear truck assembly 12. FIG. 1B illustrates a detailed view of the main gear truck assembly 12. The main gear truck assembly 12 includes a plurality of axles 85 for mounting the wheels 11. To properly install the wheels 11 on the axles 85, a mechanic or other qualified ground crew personnel installs a washer 65 on the axle 85 before tightening an axle nut 70 to secure the wheel 11 and properly load wheel bearings. This ensures the proper alignment and rotation of the wheel 110 and prevent premature wear or friction, total wheel loss, among other potential problems. If a mechanic forgets to install the washer 65, the wheel 110 and landing gear wheel may fail to function properly, be damaged, damage the axle 85, landing gear and other structural components and hamper directional control of the aircraft Currently, it is fairly easy for a mechanic to accidentally leave out the washer 65 during wheel changes. For example, typically, the washers 65 may get stuck to the old wheel 11 as a result of grease or dirt buildup. When a new wheel 11 is installed without a washer 65, the axle nut 70 may still be tightened which makes it difficult for the mechanic to detect the faulty installation. Further, since the axle nut washer 65 is located between the wheel 11 and nut 70, the missing component may be difficult to detect visually or by feel. Damage that results from such faulty installations may lead to unsafe conditions, require costly repairs, which leads to aircraft downtime. Furthermore, with regard to safety, improper installation of these components may result in monetary and other fines from regulatory agencies, and even worse, may result in the wheels being separated from the axle leading to costly accidents during landing or take off of the aircraft.

Even though the above-mentioned faulty installations are described in the context of aircraft landing gears, one of ordinary skill in the art can understand and appreciate that such faulty installations of wheels without the washer may occur in any other type of vehicle as well. For example, such faulty installations may also occur in automobiles such as cars, jeeps, etc. Therefore, there is a need for a fastener that overcomes the above-mentioned shortcomings of conventional technology.

SUMMARY

The present disclosure addresses the above-mentioned shortcomings of conventional nut and washer technology by providing a fastener technology that integrates a nut and its corresponding washer to operate as a single unit while still allowing a free rotation of the washer respective to the nut. In other words, the fastener technology described herein provides a mechanism to ensure that the washer and the nut will be installed and/or removed as a single unit, thereby preventing a loss of the washer or an omission/misplacement of the washer as part of reassembly activities during wheel and/or brake servicing, and any resulting consequences.

In an example aspect, a fastener technology includes an example nut and washer assembly that is formed by adapting an existing nut to accept a rotatable washer disposed within a mechanical sleeve housing that is applied to the nut. In particular, the mechanical sleeve housing of the example nut and washer assembly includes an inner surface that has been adapted to receive and seat a washer. For example, the inner surface of the mechanical sleeve housing includes a lip that receives and seats the washer such that at least a portion of the mechanical sleeve housing axially overlaps the washer. Once the washer is positioned on the lip within the inner surface of the mechanical sleeve housing, the mechanical sleeve housing is fitted (e.g., swage fitted) to capture and lock the washer onto the mechanical sleeve housing while allowing a rotational movement of the washer within the mechanical sleeve housing. Further, the mechanical sleeve housing is coupled to the nut to form the nut and washer assembly that prevents a separation of the washer from the nut while allowing a rotation of the washer with respect to the nut.

These and other aspects, features, and embodiments of the present invention may be more clearly understood and appreciated from a review of the following detailed description of the disclosed embodiments and by reference to the drawings and claims.

BRIEF DESCRIPTION OF THE FIGURES

Example embodiments are illustrated by way of example and not limitation in the figures of the accompanying drawings, in which.

Many aspects of the disclosure can be better understood with reference to the above drawings. The elements and features in the drawings are not necessarily to scale; emphasis is instead being placed upon clearly illustrating the principles of example embodiments of the present disclosure. Moreover, certain dimensions may be exaggerated to help visually convey such principles. In the drawings, reference numerals designate like or corresponding, but not necessarily identical, elements throughout the several views.

DETAILED DESCRIPTION OF EXAMPLE EMBODIMENTS

Disclosed are a system, apparatus, and method of an example nut and washer assembly that is configured as a single unit by a mechanical forging process including, but not limited to, swaging and then using a form of interference fit or mechanical joining to permanently attach the part. The term 'mechanical forging' as used herein may generally refer to any appropriate manufacturing process that involves shaping of metal using compressive forces. Examples of mechanical forging may include, but are not limited to, roll forging, swaging, roller swaging, cogging, open-die forging, impression-die forging, press forging, automatic hot forging and upsetting, etc.

In one example, the washer is concentrically positioned within a mechanical sleeve housing. Then, the mechanical sleeve housing is swaged to trap the washer such that the washer and the mechanical sleeve housing operate as a single unit while allowing the washer and the mechanical sleeve housing to freely rotate respective to each other. The mechanical sleeve housing and washer unit is then coupled to the nut to form the nut and washer assembly.

Technology associated with the nut and washer assembly will be described in greater detail with reference to FIGS. 2-6, which describe representative embodiments of the nut and washer assembly. It will be appreciated that the various embodiments discussed herein need not necessarily belong to the same group of example embodiments, and may be grouped into various other embodiments not explicitly disclosed herein. In the following description, for purposes of explanation, numerous specific details are set forth in order to provide a thorough understanding of the various embodiments.

Figure 2:
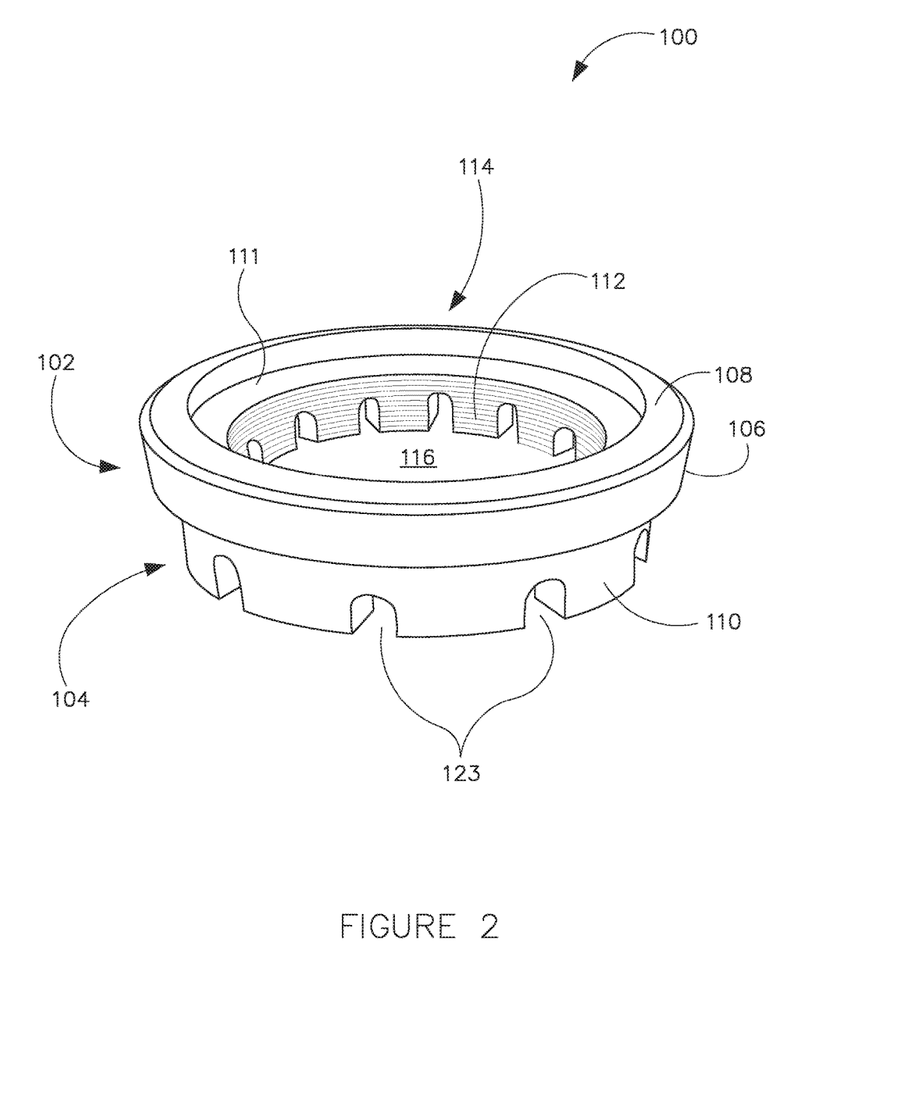
FIG. 2 illustrates a perspective view of an example nut and washer assembly having a castellated nut, in accordance with example embodiments of the present disclosure.
Figure 3A:
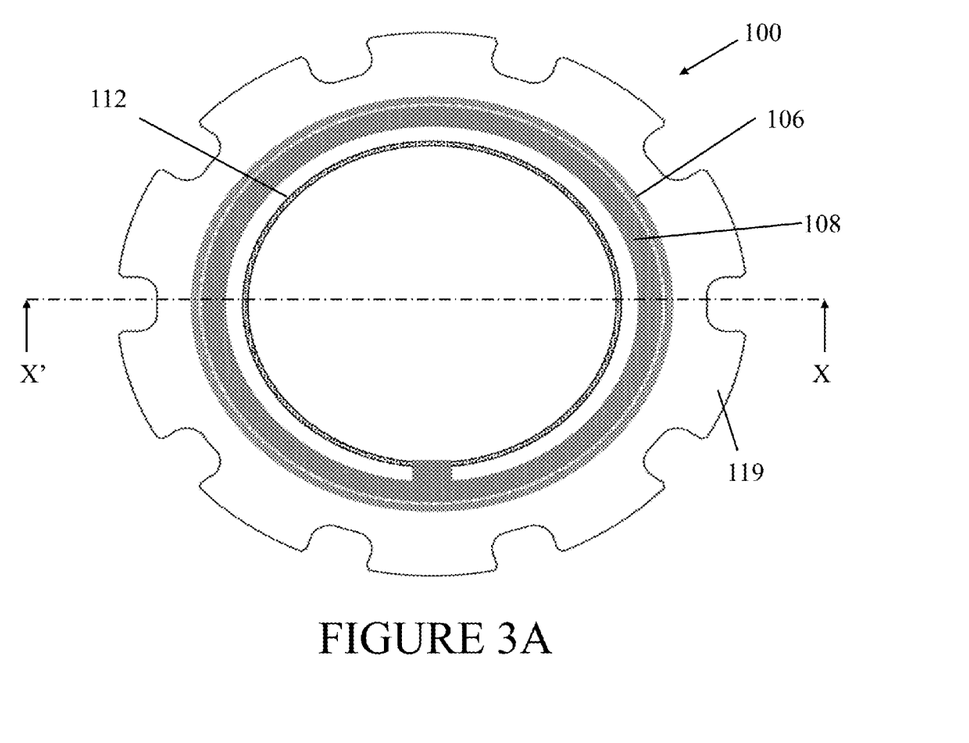
FIG. 3A illustrates a top view of another example nut and washer assembly, in accordance with example embodiments of the present disclosure.
Figure 3B:
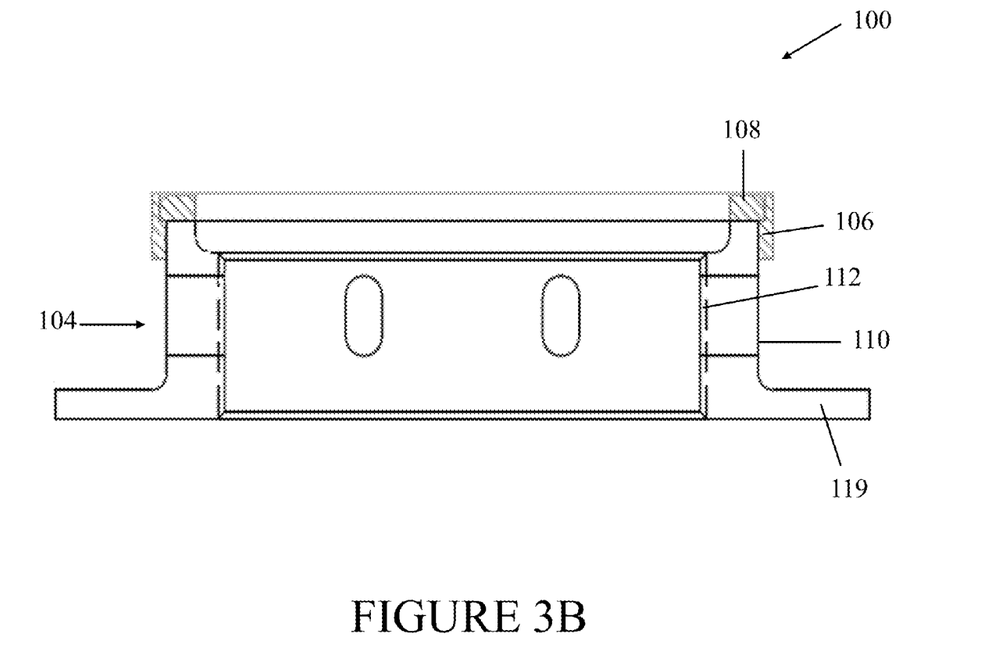
FIG. 3B illustrates a cross-sectional view of the example nut and washer assembly of FIG. 3A along an X-X' axis, in accordance with example embodiments of the present disclosure.
Figure 4:
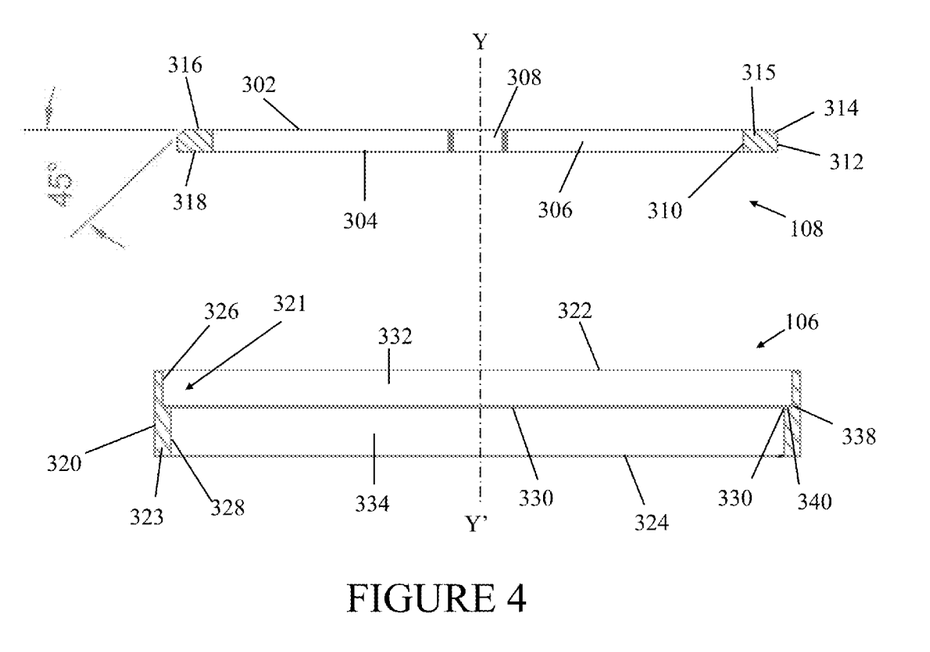
FIG. 4 illustrates a cross-sectional view of an example washer of the example nut and washer assembly of FIG. 2 and a mechanical sleeve housing for the example washer, in accordance with example embodiments of the present disclosure.
Figure 5:
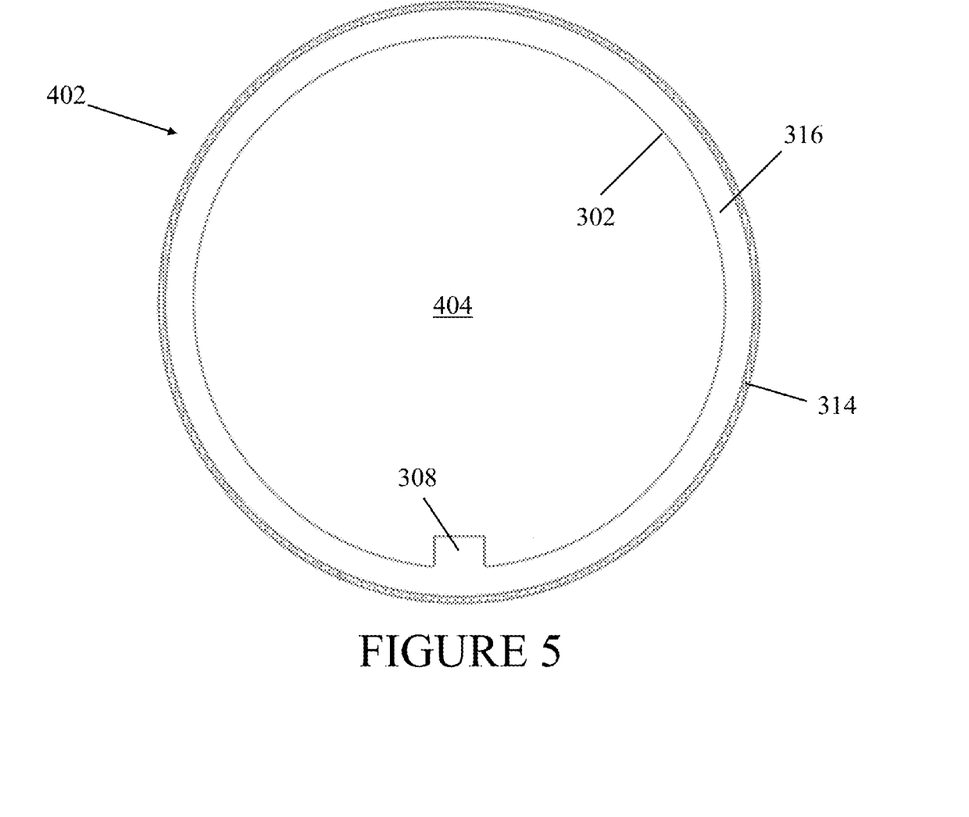
FIG. 5 illustrates a top view of the example washer of FIG. 4, in accordance with example embodiments of the present disclosure.
Figure 6:
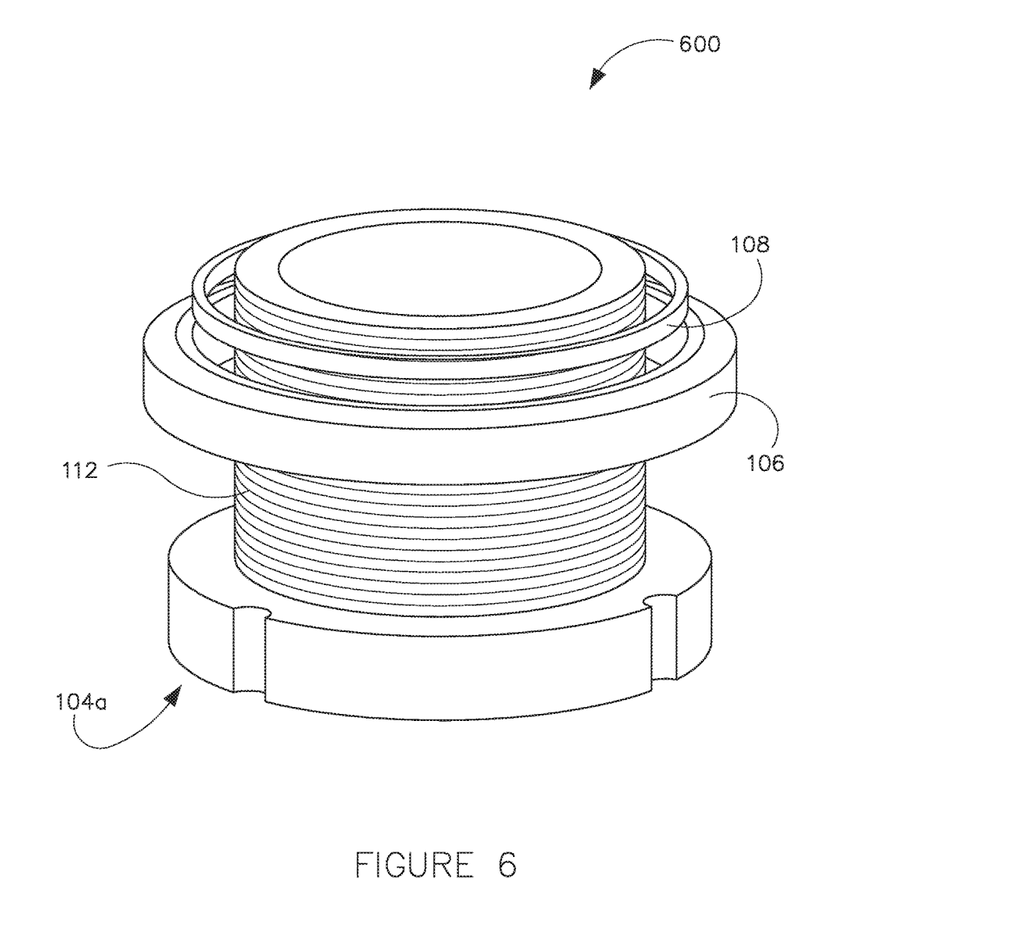
FIG. 6 illustrates an exploded view of yet another example nut and washer assembly where the nut is configured to couple with an axle shaft having threads on an inner surface, in accordance with example embodiments of the present disclosure.

FIG. 2 illustrates a perspective view of an example nut and washer assembly having a castellated nut, in accordance with example embodiments of the present disclosure; FIG. 3A illustrates a top view of another example nut and washer assembly, in accordance with example embodiments of the present disclosure; FIG. 3B illustrates a cross-sectional view of the example nut and washer assembly of FIG. 3A along an X-X' axis, in accordance with example embodiments of the present disclosure; FIG. 4 illustrates a cross-sectional view of an example washer of the example nut and washer assembly of FIG. 2 and a mechanical sleeve housing for the example washer, in accordance with example embodiments of the present disclosure; FIG. 5 illustrates a top view of the example washer of FIG. 4, in accordance with example embodiments of the present disclosure; and FIG. 6 illustrates an exploded view of yet another example nut and washer assembly where the nut is configured to couple with an axle shaft having threads on an inner surface, in accordance with example embodiments of the present disclosure.

Referring to FIGS. 2-5, the nut and washer assembly 100 may include a substantially ring-shaped nut 104 (herein 'nut 104') and a washer unit 102 that is coupled to the nut 104. In particular, the washer unit 102 may include a substantially ring-shaped mechanical sleeve housing 106 (herein 'housing 106') and a substantially ring-shaped washer 108 (herein 'washer 108') that is disposed and retained within the housing 106 such that the washer 108 is not separable from the housing 106 and/or nut 104, but is rotatable with respect to the housing 108 and/or the nut 104.

As illustrated in FIGS. 2 and 3, the nut 104 may have a substantially cylindrical inner surface 111 that defines a through cavity 116 and a substantially cylindrical outer surface 110 (herein 'outer surface') that is concentric with the substantially cylindrical inner surface 111 (herein 'inner surface'). In certain example embodiments, the inner surface 111 of the nut 104 may have a threaded portion 112 as illustrated in FIGS. 2 and 3 that is configured to mate with corresponding threading on a mounting surface, such as an axle shaft threading on an outer surface of the axle shaft (not shown). However, in other example embodiments, the threaded portion 112 may be on the outer surface 110 of the nut 104 to mate with axle shafts that have threads on an inner surface. Furthermore, in some example embodiments, the bottom portion of the nut 104 may have a plurality of castellation slots 123 to lock the nut 104 in place after proper torquing. However, in other example embodiments, instead of the castellation slots 123, the bottom portion of the nut 104 may include completed slots that are configured to receive cross bolts (not shown) adapted to secure the nut 104 to the axle shaft, and/or a flanged portion 119 that extends radially outward and substantially horizontally from the outer surface 110 of the nut 104 to provide additional safety and to make sure the nut does not rotate of the axle shaft.

In certain example embodiments, the nut 104 described in the present disclosure may be a standard axle nut, however, in other example embodiments, any other appropriate type of nut may be used without departing from a broader scope of the present disclosure. Further, in other example embodiments, the nut 104 may have any other appropriate shape or structure without departing from a broader scope of the present disclosure. For example, the nut 104 may have an octagonal outer surface instead of the substantially cylindrical outer surface without departing from a broader scope of the present disclosure.

As illustrated in FIGS. 2 and 3, the housing 106 of the washer unit 102 may be fixedly coupled to the outer surface 110 of the nut 104 such that the housing 106 is concentric with the nut 104 and the housing 106 is not movable axially or rotationally with respect to the nut 104. In particular, the housing 106 may be coupled to a top portion of the outer surface 110 that is opposite to the portion having the castellation slots 123 or the flanges 119 such that a remaining portion of the nut's outer surface 110 provides sufficient space for gripping by a tool (or hand) to tighten and loosen the nut 104. That is, the washer unit 102 may be attached to the nut 104 without appreciable change to the torque surfaces of the nut that load the bearing. Accordingly, the addition of the washer unit 102 to an existing standard nut may not change the torque values associated with the nut. In certain example embodiments, the housing 106 may be coupled to the outer surface 110 of the nut 104 using interference fit, force fit or press fit. However, in other example embodiments, any other appropriate coupling mechanism, such as adhesives, wet primer/sealant, etc., may be used to fixedly couple or attach the housing 106 to the nut 104.

In particular, as illustrated in FIGS. 3 and 4, the housing 106 may include a substantially cylindrical inner surface 321 (herein 'interior surface 321') that defines a through cavity 114, a substantially cylindrical outer surface 320 (herein 'exterior surface 320') that is concentric with the interior surface 321, and a body 323 that extends between the interior surface 321 and the exterior surface 320. Further, the interior surface 321 of the housing 106 may be trimmed or indexed to receive and/or seat the washer 108 such that at least a portion (e.g., portion 332) of the interior surface 321 axially overlaps the washer 108.

The interior surface 321 of the housing 106 may include a top portion 332 (herein 'sleeve portion') that extends downward from a top inner circular edge 322 towards an inner intermediate edge 338 that is disposed between the top inner annular edge 322 and the bottom inner annular edge 324 of the housing 106, a lip 340 that extends radially outward and substantially horizontally from the inner intermediate edge 338 to the outer intermediate edge 330, and a bottom portion 334 that extends downward from the outer intermediate edge 330 to the bottom inner annular edge 324. The lip 340 of the housing 106 may seat the washer 108 within the housing 106 such that the sleeve portion 332 of the housing's interior surface 321 axially overlaps the washer 108 as illustrated in FIGS. 2 and 3.

As illustrated in FIGS. 3-5, the washer 108 may include a substantially cylindrical inner surface 306 (herein 'internal surface 306') that extends from a top inner annular edge 302 to the bottom inner annular edge 304 and defines a through cavity 404, a chamfered top outer edge 318 (herein 'chamfered edge 318'), a substantially cylindrical outer surface 312 (herein 'external surface 312') that extends from the chamfered edge 318 to the bottom annular outer edge, a top surface 316 that extends between the top inner annular edge 302 and one end of the chamfered edge 318, a bottom surface 318 that extends between the bottom annular inner edge 304 and the bottom annular outer edge, and a body 315 that extends between the internal surface 306, the external surface 312, the chamfered edge 318, and the top and bottom surfaces (316, 318). Further, in certain example embodiments, the washer 108 may include a tang 308 that protrudes inwardly into the cavity 404 defined by the internal surface 306 of the washer 108 and towards the center of the washer 108. The tang 308 may help to line the washer 104 with the axle shaft of aircraft acting as a guide and also helps in transferring the torque to the loaded component (example—bearings) without requiring a larger contact surface. In other example embodiments, the washer 108 may not be a tang washer, i.e., the washer 108 may not include the tang 308.

To form the washer unit 102, i.e., to integrally couple, capture, or trap the washer 108 within the housing 106 such that the washer 108 is not separable from the housing 106, but is rotatable with respect to the housing 106:

(i) a portion of the bottom surface 318 of the washer 108 that is adjacent the bottom outer annular edge may be seated on the lip 340 of the housing 106 while a remaining portion of the bottom surface 318 projects out from the lip 340 towards the cavity 114 defined by the interior surface 321 of the housing 106 such that the external surface 312 of the washer 108 faces the sleeve portion 332 of the housing's interior surface 321 (axial overlap), and (ii) at least a portion of the exterior surface 320 of the housing 106 may be compressed such that the sleeve portion 332 of the housing's interior surface 321 may engage the external surface 312 of the washer 108 to an extent that prevents the washer 108 from being separated from the housing 106.

In other words, once the washer 108 is disposed within the housing 106 as described above in step (i), the housing 106 may be swaged to trap the washer 108 within the housing 106 while still allowing a rotational movement of the washer 108. Even though the housing 106 is swaged to trap or prevent the washer 108 from being separated from the housing 106, the chamfered edge 318 of the washer 108 allows a rotational movement of the washer 108 with respect to the housing 106 and vice-versa. That is, if the edge of the washer 108 were not chamfered, the additional contact between the interior surface 321 of the housing 106 with the external surface 312 of the washer 108 would hinder the rotational movement of the washer 108 with respect to the housing 106 and vice-versa. Once the washer unit 102 is formed, as described above, the washer unit 102 may be fixedly coupled to the nut 104 to form the nut and washer assembly 100 such that the housing 106 and washer 108 of the washer unit 102 may be concentric with the nut 104.

In certain example embodiments, to manufacture to the nut and washer assembly 100, a sleeve (e.g., sleeve portion 332) may be formed in an interior surface of a substantially ring shaped housing. Further, a substantially ring shaped washer having a chamfered top outer edge may be disposed within the sleeve of the housing such that the top surface of the washer may be substantially aligned with the top surface of the housing and the housing axially overlaps the washer. Then, the housing may be fitted to trap the washer within the housing such that the washer is not separable from the housing, but can freely rotate with respect to the housing. The housing and washer combination is then coupled to the nut by attaching at least a portion of the housing to the nut.

During a servicing operation, for example, a brake and wheel servicing operation of an aircraft, the nut and washer assembly 100 of the present disclosure may be provided to a user, e.g., mechanic. Since the nut and washer assembly 100 are configured such that the washer 108 is not separable from the nut 108 but is freely rotatable with respect to the nut 108, the user may install and remove the nut and washer assembly 100 as a single unit, thereby preventing any faulty installations and/or misplacement of the washer during the installation and removal.

One of ordinary skill in the art can understand and appreciate that even if the present disclosure describes using a swage fitting mechanism to capture the washer within the mechanical sleeve housing, in other example embodiments, any other appropriate and/or equivalent method of fitting or forging may be used without departing from a broader scope of the present disclosure.

Further, one of ordinary skill in the art can understand and appreciate that instead of the swage fitting the mechanical sleeve housing, in other example embodiments, the washer may be swaged or forged to engage/mate with the mechanical sleeve housing such that they operate as a single unit while allowing relative axial rotational movement. For example, in some embodiments, outward pressure may be applied to the internal surface 306 of the washer 108 to expand the washer 108 till the external surface 312 of the washer 108 engages the interior surface 321 (e.g., sleeve portion 332) of the housing 106 such that the washer 108 is not separable from the housing 106 while still allowing the a relative rotational movement of the washer 106 and the housing 106. One such example where the washer 108 is swaged to form the washer unit 102 is illustrated in FIG. 6 where the washer unit 102 is coupled to a nut 104a that has threads 602 on the outer surface 610 of the nut 104a. As described above, the nut 104*a* having threads 602 on the outer surface 610 may be configured to mate with hollow axle shafts having corresponding threads on an interior surface of the axle shaft. In FIG. 6, the outer surface 610 of the nut 104*a* refers to an exterior surface of a substantially cylindrical inner wall 111 (inner diameter) of the nut 104*a*. In particular, the mechanical sleeve is attached adjacent onto the axle nut flange/head outer diameter prior to the start of the threaded region shown in FIG. 6

Even though the present disclosure describes the housing 106 as being fixedly coupled to the nut 104, one of ordinary skill in the art can understand and appreciate that in some example embodiments, the housing 106 may be integral with the nut 104 or alternatively, the nut 104 may be indexed to directly receive the washer 108 without the housing 106 without departing from a broader scope of the present disclosure. That is, in some examples, the washer 108 may be directly coupled to the nut 104 without the housing 106 such that the washer 108 is not axially movable but is rotationally movable with respect to the nut 104.

Further, even though the present disclosure describes the top outer edge of the washer 108 as having the chamfered edge 318, one of ordinary skill in the art can understand and appreciate that in other example embodiments, any other appropriate edges may be chamfered in addition to or instead of the top outer edge of the washer 108 provided it does not compromise the rotational movement of the washer 108 with respect to the housing 106. Further, even though FIG. 4 illustrates the top outer edge of the washer 108 as being chamfered at 45 degree angle, one of ordinary skill in the art can understand and appreciate that in other example embodiments, the edge of the washer may be chamfered at any other appropriate angle that prevents an axial movement of the washer with respect to the housing while allowing a relative rotational movement between the washer and the housing without departing from a broader scope of the present disclosure.

Furthermore, in various embodiments the nut 104, the washer 108, and/or the housing 106 may be made from steel. Various other embodiments may use other materials such as Teflon®. Using similar materials for all three components may reduce or prevent corrosion. In various embodiments the wire may be made from or coated with a material to prevent corrosion and/or provide lubrication between the parts that may move relative one another.

Even though the present disclosure describes the washer 108 as being trapped within the interior surface of the housing 106, one of ordinary skill in the art can understand and appreciate that in some example embodiments, the washer 108 can be disposed on the outer surface 320 of the housing 106. For example, the outer surface 320 of the housing may be trimmed to form a sleeve (e.g., sleeved portion 322) with a lip having a width that is substantially similar to the width of the washer such that the washer does not stick out of the housing. Further, in said example, the housing (interior surface 321) may be swaged to capture and trap the washer such that the washer is inseparable from the housing but can freely rotate with respect to the housing. In said example, the exterior surface 320 of the housing 106 may engage the internal surface 310 of the washer 108 and the top annular inner edge 302 of the washer may be chamfered to enable a rotational movement of the washer 108 with respect to the housing 106.

Further, even though the present disclosure describes the washer 108 and the housing 106 as being substantially ring shaped, one of ordinary skill in the art can understand and appreciate that in other example embodiments, the shape, size, and/or structure of the washer and the housing may vary without departing from a broader scope of the present disclosure provided that the arrangement of the washer with respect to the housing such that the washer is inseparable from the housing but freely rotatable within the housing is not compromised. Further, the shape, size, and/or structure of the washer and the housing may vary based on a shape, size, and/or structure of the nut to which they are coupled.

The nut and washer assembly as disclosed herein may be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" or "exemplary embodiments" given herein are intended to be non-limiting and among others supported by representations of the present disclosure.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A nut and washer assembly comprising:
   a nut;
   a washer unit that is coupled to the nut such that the washer unit is concentric with the nut; the washer unit comprising:
      a washer that is substantially ring-shaped and comprising a top outer annular edge that is chamfered, wherein the washer is a tang washer; and
      a housing that is substantially ring-shaped and having an inner surface that defines a through cavity, wherein the inner surface comprises a sleeve, and wherein using a mechanical forging process, the washer is captured within the sleeve of the housing such that the washer is inseparable from the housing and allows an axial rotation of the washer with respect to the housing.

2. The nut and washer assembly of claim 1, wherein the mechanical forging process includes swaging.

3. The nut and washer assembly of claim 1, wherein the mechanical forging process is applied to the housing to capture the washer within the sleeve of the housing.

4. The nut and washer assembly of claim 1, wherein the mechanical forging process is applied to the washer to capture the washer within the sleeve of the housing.

5. A nut and washer assembly comprising:
   a nut, wherein the nut is an axle nut; and
   a washer that is coupled to the nut via a housing such that the nut and washer forms a single inseparable unit while allowing an axial rotation of the washer with respect to the nut, wherein the washer is disposed within the housing that is coupled to the nut, and wherein the washer is a tang washer.

6. The nut and washer assembly of claim 5, wherein the housing comprises a sleeve disposed on an inner surface of the housing, and wherein the sleeve is configured to house and axially overlap the washer.

7. The nut and washer assembly of claim 6, wherein the housing is swaged to capture the washer within the sleeve such that housing and the washer are inseparable and the washer is axially rotatable within the housing.

8. The nut and washer assembly of claim 6, wherein the washer is swaged to capture the washer within the sleeve of the housing such that housing and the washer are inseparable and the washer is axially rotatable within the housing.

9. The nut and washer assembly of claim 5, wherein the washer comprises a chamfered edge that enables the axial rotation of the washer with respect to the nut.

10. A nut and washer assembly comprising:
a nut;
a washer unit that is coupled to the nut such that the washer unit is concentric with the nut and the nut and washer unit form a single inseparable unit; the washer unit comprising:
   a washer comprising a chamfered edge; and
   a housing having an inner surface that defines a through cavity,
      wherein the inner surface of the housing is configured such that a top portion of the housing defines a sleeve that is thinner than a bottom portion of the housing,
      wherein the inner surface of the housing defines a lip that extends radially inward into the through cavity and is positioned between a top inner edge and a bottom inner edge of the housing,
   wherein the washer is seated on the lip and inseparably captured in the sleeve at the top portion of the housing such that:
      an outer side surface of the washer engages a portion of the inner surface of the housing that is associated with the sleeve, and
      the washer is movable within the sleeve to complete an axial rotation with respect to the nut and the housing, and
   wherein the washer comprises a tang washer.

11. The nut and washer assembly of claim 10, wherein the housing is swaged to capture the washer within the sleeve.

12. The nut and washer assembly of claim 10, wherein the washer is swaged to capture the washer within the sleeve of the housing.

* * * * *